Feb. 1, 1949.  J. KRAUS  2,460,298
WHEEL LOCK AND HYDRAULIC RELEASE
Filed July 10, 1947  3 Sheets-Sheet 2

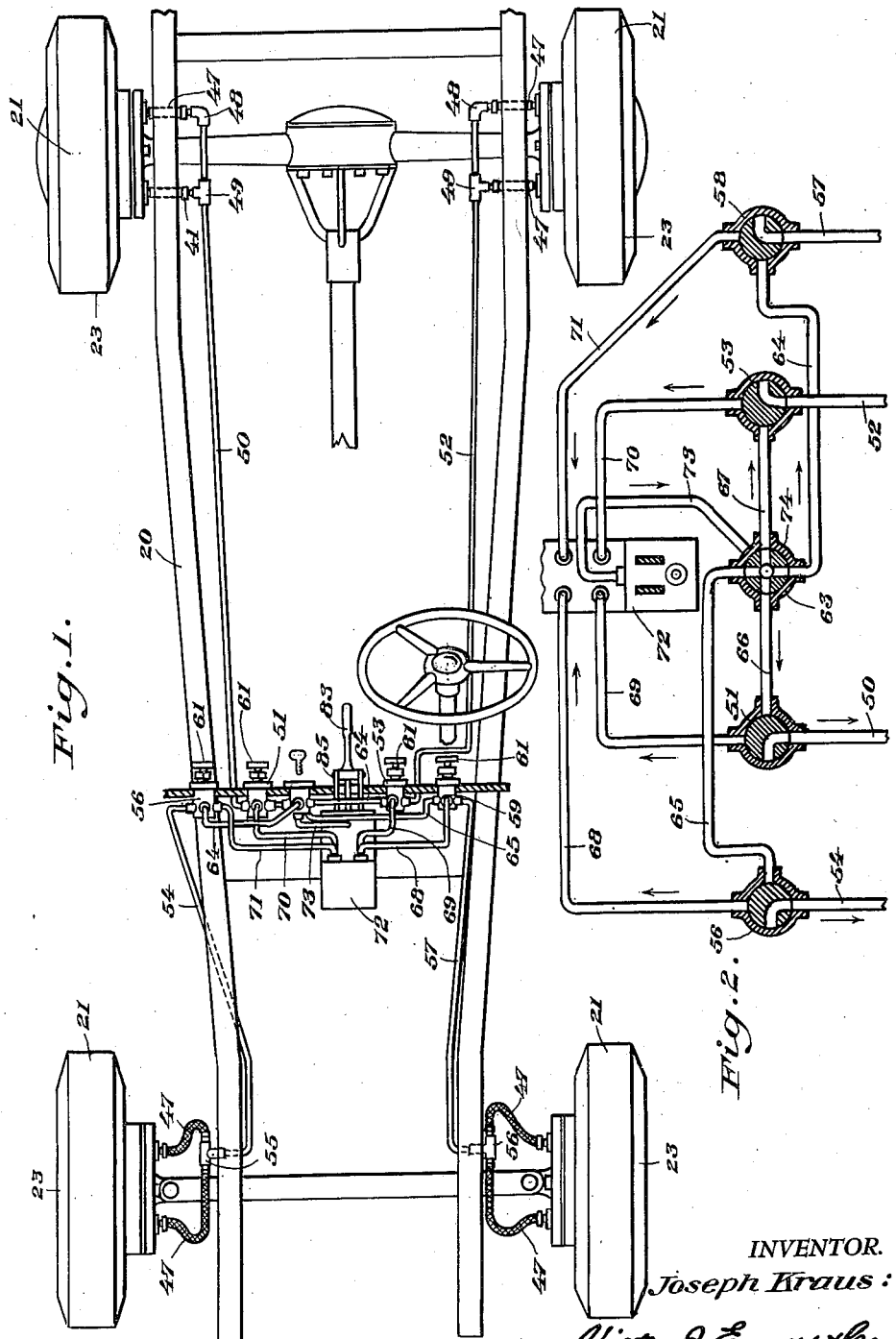

INVENTOR.
Joseph Kraus
BY Victor J. Evans & Co.
ATTORNEYS

Feb. 1, 1949.   J. KRAUS   2,460,298
WHEEL LOCK AND HYDRAULIC RELEASE
Filed July 10, 1947   3 Sheets-Sheet 3

INVENTOR.
Joseph Kraus:
BY Victor J. Evans & Co.
ATTORNEYS

Patented Feb. 1, 1949

2,460,298

UNITED STATES PATENT OFFICE 2,460,298

WHEEL LOCK AND HYDRAULIC RELEASE

Joseph Kraus, Chicago, Ill.

Application July 10, 1947, Serial No. 759,957

3 Claims. (Cl. 301—9)

1

This invention relates to wheel lock and hydraulic release for automotive vehicles.

It is an object of the present invention to provide a wheel lock for wheels which can be released by simply forcing a plunger and causing the ejection of wheel attaching elements from recesses in the wheel whereby the wheel can be released so it can be turned and quickly disengaged from the brake drum.

Other objects of the present invention are to provide a wheel lock and hydraulic release for automotive vehicles which is of simple construction, inexpensive to manufacture and efficient in operation.

For other objects and for a better understanding of the invention, reference may be had to the following detailed description taken in connection with the accompanying drawing, in which:

Figure 1 is a fragmentary sectional plan view looking upon the chassis of an automobile vehicle having wheels thereon and employing the hydraulic wheel lock release of the present invention;

Figure 2 is a diagrammatic view of the complete system showing the selector valves in section;

Figure 3:
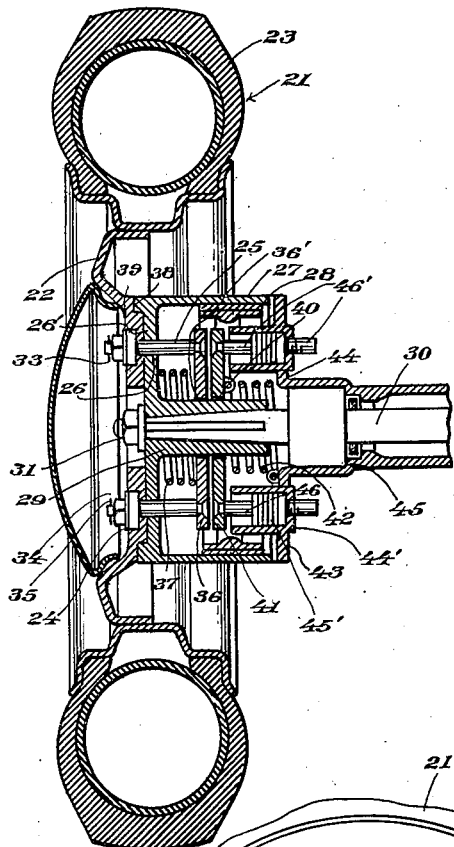
Figure 3 is a vertical sectional view of a rear wheel assembly.
Figure 4:
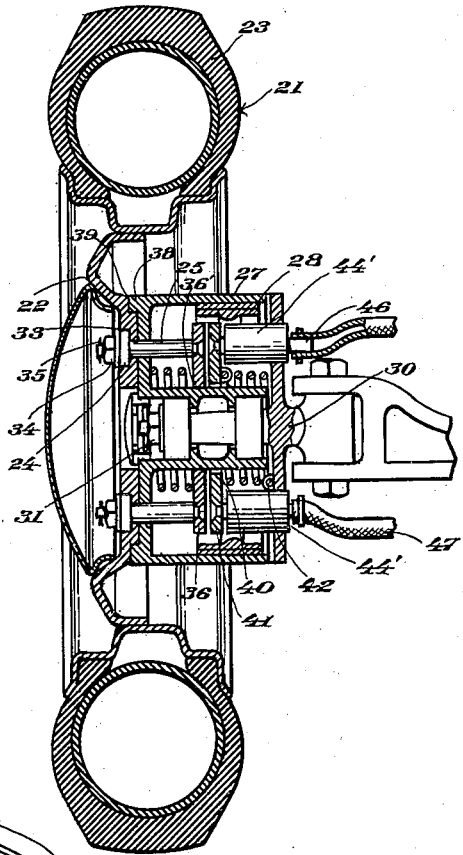
Figure 4 is a vertical sectional view of a front wheel assembly.
Figure 5:
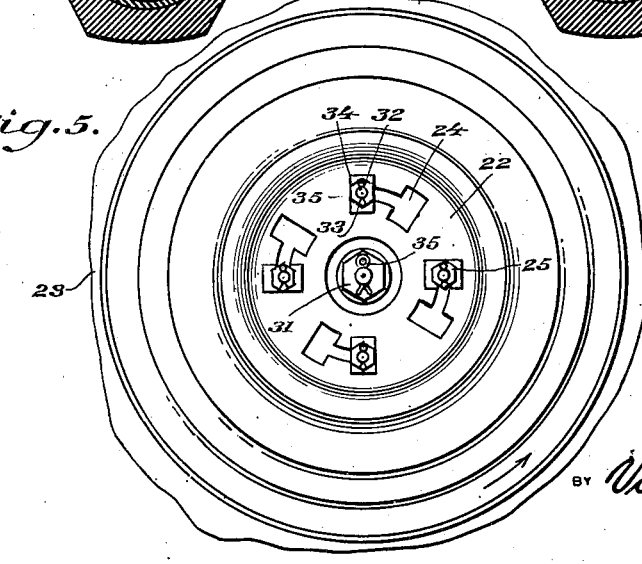
Figure 5 is a side elevational view of a wheel showing the recesses and the engaging elements which are extended therein to lock the wheel in place on the brake drum.
Figure 6:
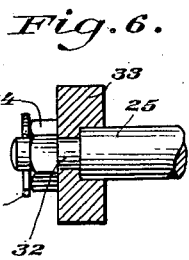
Figure 6 is a fragmentary detailed sectional view of one of the engaging elements.
Figure 7:
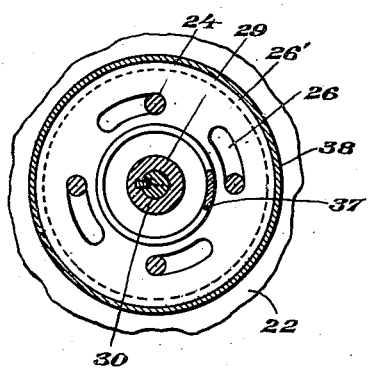
Figure 7 is a detailed sectional view of the drum, showing the slots therein and the engaging elements extending therethrough.

Referring now to the figures, 20 represents a chassis having four wheels 21 thereon. These wheels include the central wheel mounting portion 22 formed at their outer periphery in the conventional manner to retain a tire 23. The portion 22 is provided with curved I shaped slots 24 which are adapted to be inserted over the attaching bolts 25 extending through the arcuate shaped slots 26 in the circular plate 26' of a brake drum 27

2 having a braking element 28 adapted to engage therewith. The plate 26' is provided with a sleeve 29 at the center thereof to be inserted over and mounted on the tapered end of the axle 30, and be retained thereon by the nut 31. The bolts 25 are provided with a reduced portion 32 which carries the plate 33 which is fixed thereon by the nut and cotter key 34 and 35 respectively. The plate 33 is of a size to be removed from either end of the slot 24 while the portion of the slot intermediate the ends is of a size to engage the bolt 25 but prevent passage of the plate 33 therethrough. Thus the wheel 21, upon movement thereof, can be retained on the bolts 25 or removed therefrom. The bolts are connected at their inner ends to a pressure plate 36 which, by means of the central opening 36', is mounted on the sleeve 29, and the pressure plate is held inwardly of the plate 26' on the sleeve 29 by the spring 37 on the sleeve 29 of the plate 26'. The spring 37 forcing the plate 36 inwardly will draw the bolts 25 against the portion 22, causing the annular shoulder 38 on the drum 27 surrounding the plate 26' to be seated in the annular groove 39 formed in the rear of the portion 22 in alinement with the shoulder 38. Mounted on the sleeve 29, by means of the central opening 40, and adapted to engage with the pressure plate 36, is a circular plate 41, normally held out of engagement with the plate 36 by a tension spring 42 mounted on the sleeve 29. This spring surrounds the sleeve 29. Also surrounding the axle 30 is a circular plate 43, which is fixed at 44 to the axle housing 45 or formed integral therewith, and this plate carries diametrically extended fluid cylinders 44' having small pistons 45' therein. Connected with and in communication with the cylinders 44' are hydraulic fittings 46' through which fluid is forced under pressure through flexible pipes 47. The pistons 45' are connected by means of their stems 46 to the plate 41 and the flexible pipes 47 and the rear wheels are connected with an elbow and T 48 and 49 which are connected by a pipe 50 for the right rear wheel with one of the outlets of a selector valve 51 accessible to the operator of the vehicle and located preferably in the cab adjacent the forward seat portion thereof on the dash board. The arrangement just explained is common to each of the wheels and each arrangement has a communication with a selector valve. Pipe 52 to valve 53 for the left rear wheel and pipe 54 connected at one end to a T 55 for connection to pipes 47 and to selector valve 56 for the right front wheel. Pipe 57 connected at one end to a T 58 for connection to pipes 47 and to selector valve 59 for the left front wheel.

Figure 8:
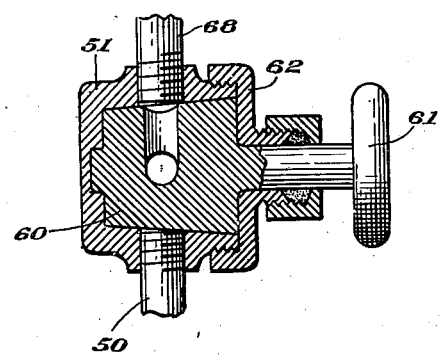
Figure 8 is a detailed sectional view of a selector valve.
Figure 9:
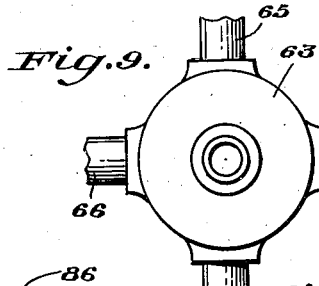
Figure 9 is a fragmentary plan view of the four way valve.
Figure 10:
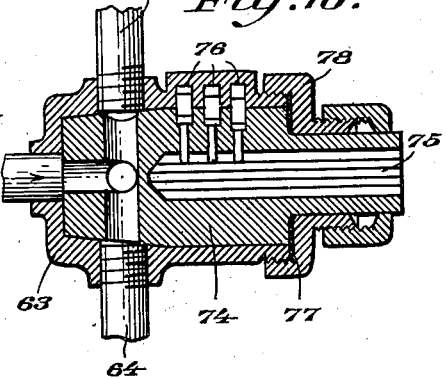
Figure 10 is a detailed cross sectional view of the valve shown in Figure 9.
Figure 11:
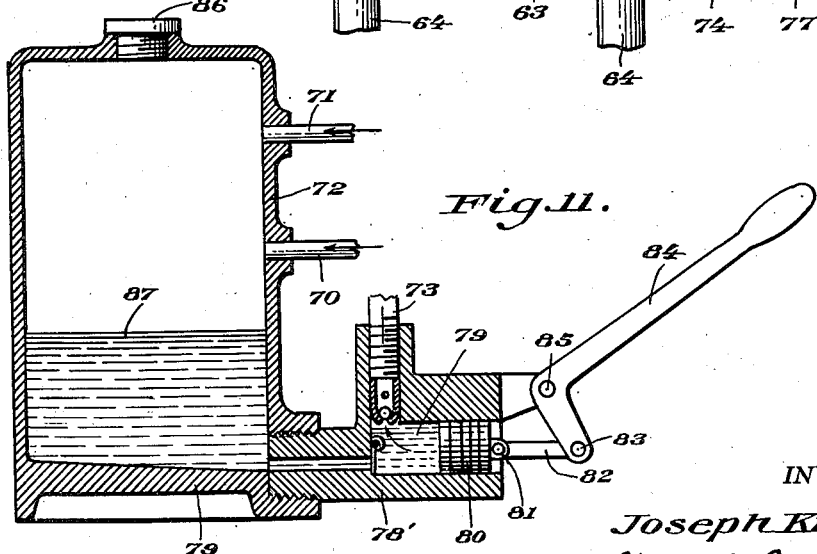
Figure 11 is a vertical sectional view of the pump and reservoir tank used in the system.

In Figure 8, wherein selector valve 51 is shown, it will be noted that there is a two way valve 60 having a handle 61 thereon. The valve 60 is normally retained in its seat by cap 62 threadably mounted on the selector valve 51. It is to be understood that all selectors are as previously described for valve 51.

Selector valve 58 is connected to the master four way valve 63 by a pipe 64 and selector valve 56 is connected to the valve 63 by a pipe 65, while selector valves 51 and 53 are connected to the valve 63 by pipes 66 and 67 respectively, valves 56, 51, 53 and 58 being connected in the order named by pipes 68, 69, 70 and 71 to the pump and reservoir tank 72, while the valve 63 is connected to the pump and reservoir 72 by the pipe 73.

The master valve 63 has the four way valve 74 which is operated by a key inserted in the keyway 75 in the valve for actuation of the tumblers 76 to lock the valve 74 against relative movement within the master valve 63. The valve 74 is swedged at 77 and is retained in place by a cap 78 threadably mounted on the master valve 63.

The pump and reservoir tank 72 comprises a pump or one stroke device 78' which is threadably connected to and in communication with the tank 79 and the pipe 73 to the valve 63. This device 78' comprises a cylinder 79 and a piston 80 operable therein to eject fluid through the pipe 73 to the valve 63 and from the valve 63 fluid will be delivered under pressure to whichever of the selector valves it is desired to operate and as determined by the particular selector valve which has been rotated for this purpose. The piston 80 has a pivotal connection 81 with a rod 82 which extends outwardly of the cylinder and on which is pivoted at 83 a handle 84, which is pivoted at 85 to the device 78'. The tank 79 is provided with a filler opening 86 for the replenishing of the fluid 87 therein.

In operation, when a selector valve is rotated, the plate 41 will be engaged with the plate 26' and force the bolts 25 outwardly against the action of the spring 37.

The plates 33 on the bolts 25 are adapted when the bolts are in their retaining position to bear against the portion 22 of the wheel 21. The shank of the bolt will extend through the narrow slot lying between the ends of the slots 24. The wheel will accordingly be held in tight engagement with the plate 26'. As the bolts are extended by the mechanism just described, the plate 33 thereon will leave through the end of the slots 24 and will permit the wheel to be removed from the brake drum 27.

Prior to the operation of the selector valves, the valve 63 must be rotated by unlocking the valve thereof. Thus the system, once locked, cannot be unlocked by any unauthorized user thereof.

There has thus been provided, a device which eliminates the use of the conventional lugs in attaching a wheel to the brake drum of an automobile, and it is believed that from the foregoing description, the operation and construction of the device will be apparent to those skilled in the art.

It is also to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A wheel lock and hydraulic release comprising a plate having a plurality of bolts connected thereto at circumferentially spaced locations thereon, said bolts adapted to extend through a wheel plate, a wheel having recesses for receiving plates fixed to the bolts, said recesses being adapted when the wheel is rotated to one position to retain the wheel in locked engagement with the wheel plate and when rotated to an angular position adapted to permit the wheel to be removed from the bolts, and an actuating device adapted to apply pressure to the plates having the bolts to effect their outward movement, and spring means reacting between the plates to normally retain the bolts in locked engagement with the wheel recesses.

2. A wheel lock and release as defined in claim 1, and said actuating means for the bolt containing plate comprising fluid actuating cylinders having a member for engaging the bolt containing plate, a fluid pump adapted to be located in the cab of the vehicle, a master valve in fluid communication with the pump, and selector valve elements in communication with the master valve for controlling the flow of fluid under pressure to the respective wheel arrangements.

3. A wheel lock and release device as defined in claim 1, and said actuating means comprising fluid cylinders at the wheels, a plate connecting the fluid cylinder devices together and adapted to engage with the plate containing the bolts, delivery pipe means for connecting the fluid cylinders together, a master valve on the vehicle and connected with the fluid delivery pipes, and a manually operated pump connected with the master valve and adapted with one stroke to effect the movement of the fluid cylinder devices to release the bolts, said master valve connected to a plurality of selector valve elements having valves with manually operated handles thereon, and means associated with the master valve for retaining the master valve in locked or unlocked positions.

JOSEPH KRAUS.

No references cited.